(No Model.)
L. B. BROWN.
CHURN DASHER.
No. 370,724.  Patented Sept. 27, 1887.
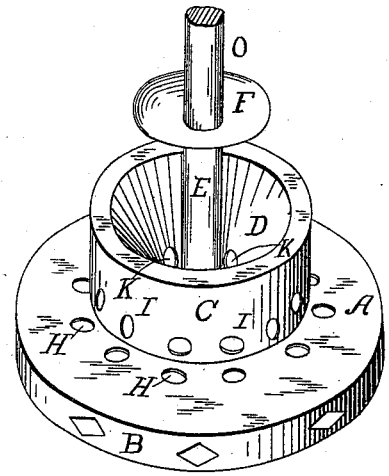
Fig. I.
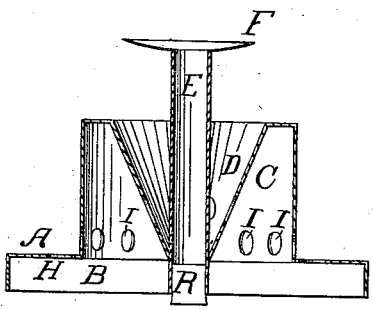
Fig. II.
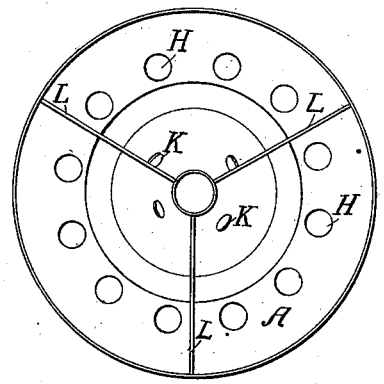
Fig. III.
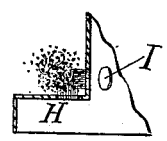
Fig. IV.
WITNESSES:
B. M. Whitaker
F. B. Townsend
INVENTOR
Levi B. Brown
BY Jas. A. Cowles
ATTORNEY

UNITED STATES PATENT OFFICE.

LEVI BYRON BROWN, OF ALEDO, ILLINOIS.

CHURN-DASHER.

SPECIFICATION forming part of Letters Patent No. 370,724, dated September 27, 1887.

Application filed July 22, 1887. Serial No. 245,024. (No model.)

*To all whom it may concern:*

Be it known that I, LEVI BYRON BROWN, a citizen of the United States, residing at Aledo, in the county of Mercer and State of Illinois, have invented a new and useful Improvement in Churn-Dashers, of which the following is the specification.

To readily and quickly accomplish the act of churning, the cream has to be agitated in such a way that the small globular vessels containing the butter will be broken, thus allowing the butter to assemble or gather in one mass.

The object of this invention is to produce a dasher with which this agitation can be produced in the cream, whereby the globular vessels will be broken and the butter gathered into a single mass in a comparatively short time.

Figure I is a perspective view. Fig. II is a vertical sectional view. Fig. III is a bottom view, and Fig. IV is a detail, showing the means employed to atomize the cream.

Similar letters of reference refer to similar parts.

I use sheet metal in making my dasher.

A is the base, having the rim B surrounding it.

C is a central elevation with the re-entering conical top D.

E is the socket for the handle O.

F is a conical disk attached to the handle.

In the base A are a series of holes, H H, surrounding the central elevation, C, and in this central elevation are a series of holes, I I. Each hole I is immediately over a hole, H, in the base. In the re-entering cone D are a series of holes, K.

On the dasher being forced down through the cream it rushes through the holes I I and H H. The two currents being at right angles with each other come in collision, as shown in Fig. IV. Thus the cream is atomized, which thoroughly breaks and destroys the globular vessels. The re-entering cone D forces the cream through the holes I. This adds to the force of the cream as it strikes against the vertical current which comes through the holes H. The disk F gives it additional agitation.

L L are braces extending from rim B to center, to give strength and to support the base of the socket E. At base of socket E is a cork, R, or similar elastic substance, to receive the concussion at the bottom of the churn.

I claim—

The churn-dasher described, consisting of the following elements: a base, A, provided with holes H H, a central elevation, C, provided with holes I I, located immediately above holes H H, re-entering cone D, socket E, and disk F.

LEVI BYRON BROWN.

Witnesses:
 DAVID BROWN,
 ALBERT NESBITT.